United States Patent [19]

Shibazaki et al.

[11] Patent Number: 5,004,996
[45] Date of Patent: Apr. 2, 1991

[54] HYDRAULIC ACTUATING APPARATUS

[75] Inventors: Toshiji Shibazaki; Masaru Okano; Naoto Kishida; Yoshihiro Ozaki; Kunihiko Iyama, all of Saitama, Japan

[73] Assignee: Toyo Denso Kabushiki Kaisha, Tokyo, Japan

[21] Appl. No.: 399,057

[22] Filed: Aug. 28, 1989

[30] Foreign Application Priority Data

| Aug. 26, 1988 | [JP] | Japan | 63-111837[U] |
| Aug. 26, 1988 | [JP] | Japan | 63-111838[U] |
| Nov. 22, 1988 | [JP] | Japan | 63-152668[U] |

[51] Int. Cl.$^5$ .................... H01C 10/10; H01C 10/30
[52] U.S. Cl. ..................................... 338/36; 338/39; 338/160; 338/176
[58] Field of Search .................. 338/68, 36, 118, 160, 338/176, 334, 37, 39, 42

[56] References Cited

U.S. PATENT DOCUMENTS

| 4,279,162 | 7/1981 | Neill et al. | 73/746 |
| 4,433,321 | 2/1984 | Widdowson | 338/42 |
| 4,449,112 | 5/1984 | Gould | 338/39 |
| 4,778,956 | 10/1988 | Betterton et al. | 200/83 |

Primary Examiner—Bruce A. Reynolds
Assistant Examiner—Marvin M. Lateef
Attorney, Agent, or Firm—Armstrong, Nikaido, Marmelstein, Kubovcik, & Murray

[57] ABSTRACT

A hydraulic actuating apparatus for sensing hydraulic pressure and producing an output signal representative of the sensed hydraulic pressure includes a base portion, a case, and a variable resistor unit. A slider is movably connected to the variable resistor unit, and the variable resistor unit is connected to the base, the slider being movable relative to the variable resistor unit by an amount proportional to the hydraulic pressure applied to the slider. The variable resistor unit has a resistance which changes in response to movement of the slider. A resilient member is provided which is resiliently deformable by movement of the slider relative to the variable resistor unit, the resilient means exerting a restoring force on the slider opposing the movement of the slider caused by the hydraulic pressure. An adjusting mechanism is provided for setting an initial resistance value of the variable resistor unit, the variable resistor unit having a portion which is in contact with the adjusting mechanism.

9 Claims, 5 Drawing Sheets

HYDRAULIC ACTUATING APPARATUS

BACKGROUND OF THE INVENTION

The present invention relates to hydraulic actuating apparatus for cars in which a fuel pump switch and an oil pressure sensor are integrally assembled into the same case. More particularly the present invention is directed to a hydraulic actuating apparatus which has an adjusting means to set the initial resistance value between the slider which slides responsive to hydraulic pressure and a variable resister unit which alters the resistance value responsive to the movement amount of said slider.

PRIOR ART

There is the well-known apparatus integrated with the variable resistor device of the oil pressure sensor and the fuel pump switch for cars in which the initial position of the variable resistor device is out of the predetermined one due to the clamping assembly, resulting in the inaccuracy of the fuel pump switch operation and the pressure detecting inaccuracy of the oil pressure sensor.

SUMMARY OF THE INVENTION

The main object of the present invention is to provide the hydraulic actuating apparatus to improve easily the accurate setting of the initial position in which we provide an improved hydraulic actuating apparatus having a slider which slides responsive to hydraulic pressure, a variable resistor unit which alters the resistance value responsive to the movement of said slider, a resilient means which determines said movement and an adjusting means to set the initial resistance value.

BRIEF DESCRIPTION OF THE DRAWINGS

FIG. 1 is a vertical sectional view of a first preferred embodiment of a hydraulic actuating apparatus. FIG. 2 is an enlarged view of the main part of FIG. 1. FIG. 3 is a extended view of FIG. 2. FIG. 4 is a partially vertical sectional view of a second preferred embodiment of a hydraulic actuating apparatus. FIG. 5 is an enlarged view of the main part of FIG. 4.

DETAILED DESCRIPTION OF THE PREFERRED EMBODIMENTS

Figure 1:
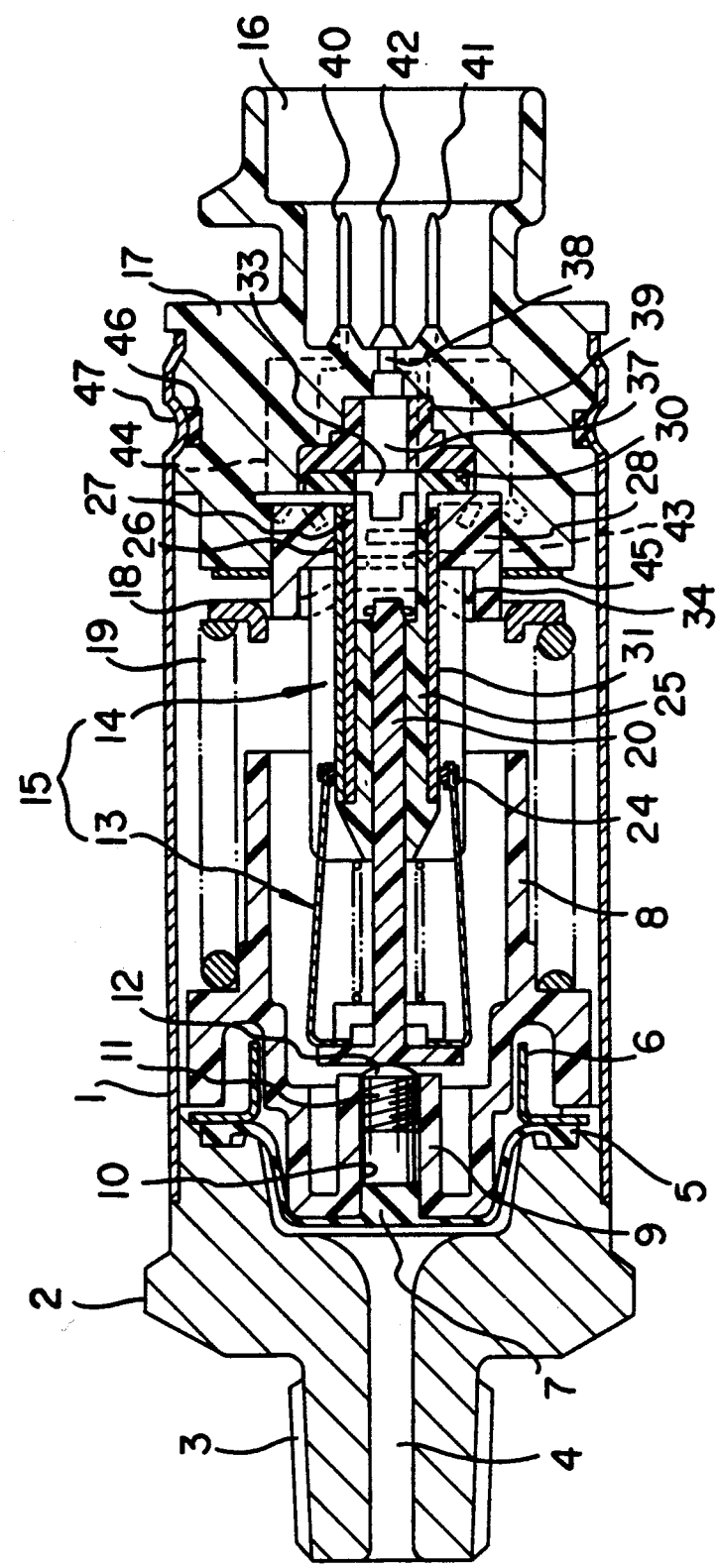
FIG. 1 to FIG. 3 show a first preferred embodiment.
Figure 2:
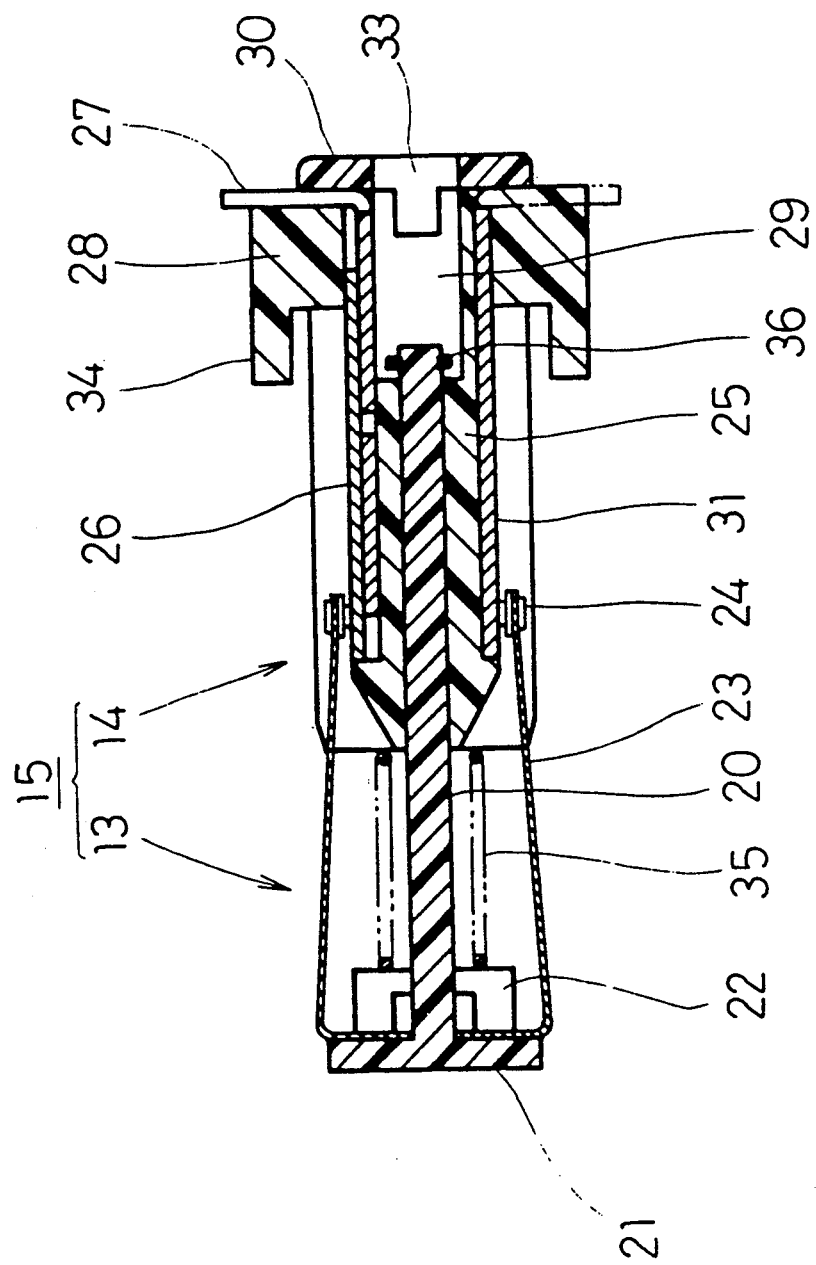
Figure 3:
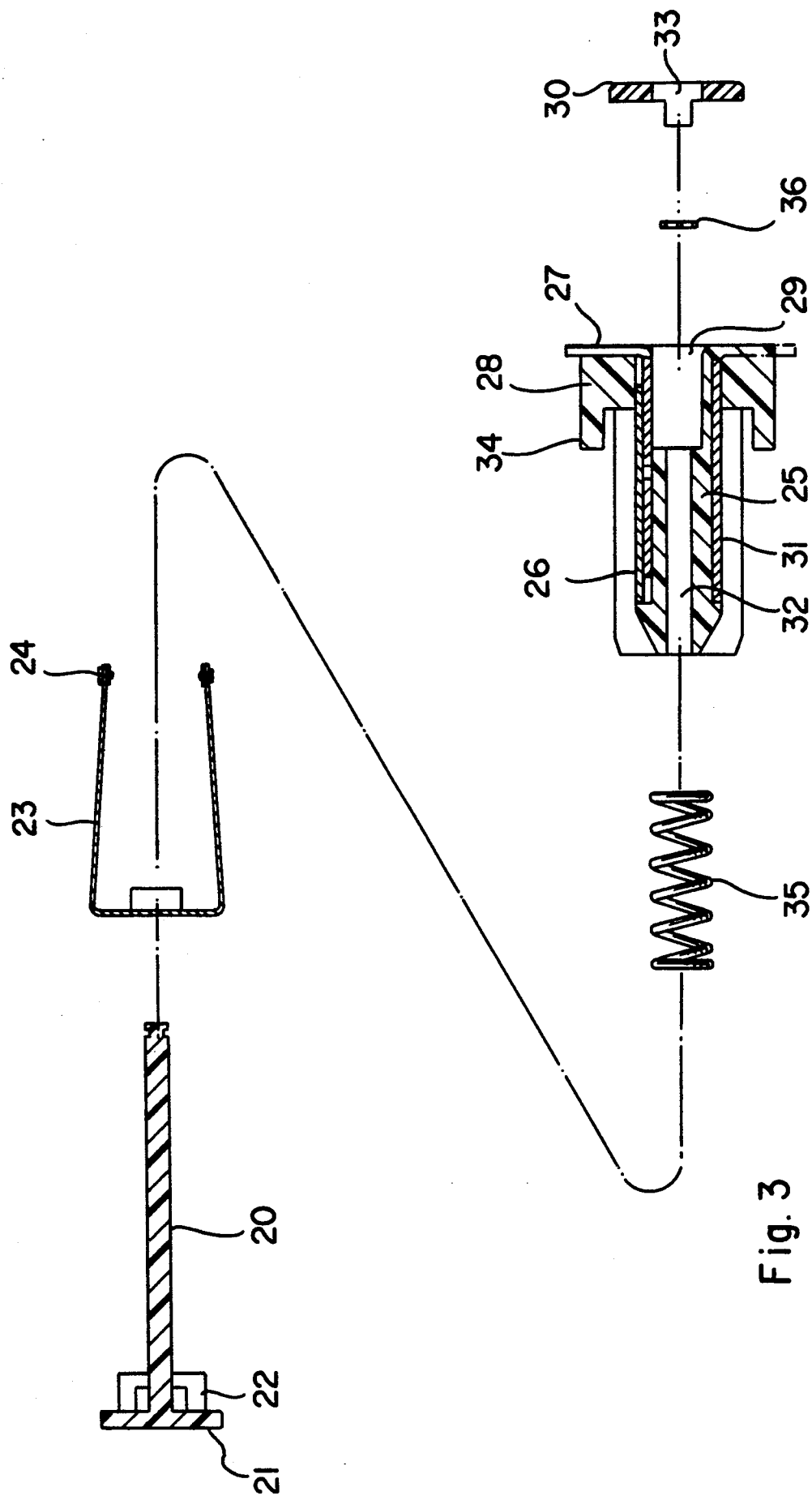

FIG. 1 to FIG. 3 show a first preferred embodiment of the present invention. FIG. 1 is a vertical sectional view of an apparatus combining an oil pressure sensor and a fuel pump switch for cars. The present apparatus is an embodiment of a pressure variable resistor device in which a mouthpiece 2 is inserted into one end portion of a case 1 which is made of metal and has a cylindrical figure and both are integrated by welding at the inserting portion. A screw portion 3 projects from the mouthpiece 2 to mount on the frame body, not shown in the drawing, and an oil path 4 is made the axial center thereof which passes through both, the screw portion 3 and the mouthpiece 2. A diaphragm 5 is provided to cover the oil path 4 at the inside of the case 1 side in the mouthpiece 2 together with the outer flange of a retainer 6 made in the pipe figure by clamping and has a boss 7 projecting toward the case 1 at the central portion thereof. The boss 7 is inserted into one end of a cylindrical portion 9 which projects at the bottom center of a slider 8. The slider 8 is a sliding element according to the present invention with the cylindrical bottom and is slidable in the case 1. The cylindrical portion 9 is open at both ends and has a threaded hole 10 at the inner peripheral portion thereof.

An adjuster 11 is threaded to the screwed hole 10, which has a curved head 12, and projects from the inner end of the cylindrical portion 9. The curved head 12 contacts with a slide contact unit 13 with a resistor unit 14 to build a sub-assembly unit 15. The resistor unit 14 is integrally assembled with a base portion 17 of a coupler 16 which is inserted into the other end portion of the case 1. There is provided a compression coil spring 19 between the slider 8 and a retainer 18 which is supported under a floating condition in the resistor unit 14 side.

FIG. 2 and FIG. 3 describe the sub-assembly unit 15 and show respectively the enlarged view of the assembled condition and the developed view thereof. The slide contact unit 13 has substantially "T" form at the vertical sectional view and comprises a shaft 20 made of plastic which extends to the resistor unit 14, a flange 21 formed at one end portion thereof, a plate spring conductor 23 which extends along both sides of the shaft 20 and the middle portion of which is supported with the wall portion 22 made on the flange 21, and a slide contact 24 provided at the free end of the plate spring conductor 23. The resistor unit 14 comprises a holder 25 made of plastic extending to the slide contact unit 13 side into which the tip end of the shaft 20 can be inserted, a plate resistor 26 provided at the sliding portion of one of the sliding contacts 24, a connecting plate 27 to connect to the terminal of the coupler 16 described hereinafter, a cap 30 inserted into a space 29 having an open at one end thereof in order to fix the connecting plate 27 to the base portion 28 of the holder 25, and a ground plate 31 provided at the sliding position of the other slide contact 24 in the opposite side of the plate resistor 26. One end portion of the ground plate 31 is inserted into the base portion 28. A shaft hole 32 is made at the center of the holder 25 to slidably insert the shaft 20 and communicates with the space 29 and further an air breathing hole 33 communicating with the space 29 is made in the cap 30, as shown in to FIG. 3.

A guide 34 is formed in the base portion 28 projecting to the slide contact unit 13 and the retainer 18 is movably supported around the guide 34 as shown in FIG. 1.

How to make the sub-assembly unit 15 will be described in the following. At first, the slide contact unit 13 and the resistor unit 14 are respectively assembled previously and the shaft 20 passes through the inside of the coil shaped return spring 35 and the shaft hole 32 to a space 29, and finally a means is provided to prevent the shaft 20 from coming out which is in the form of a stopping element 36 such as an "E" ring, resulting in building the integral sub-assembly unit 15 of the slide contact unit 13 and the resistor unit 14. An air breathing hole 37 is also made in the base portion 17 next to the cap 30 and communicates with the space 29 through the air breathing hole 33. The air breathing hole 37 communicates with the atmosphere outside the coupler 16 through a small hole 38 and the cap 30 contacts with a pipe shaped pressing element 39 within the air breathing hole 37.

There are projected four terminals three of which are referred to by numerals 40 to 42 and one of which is not shown. The other end portion of each of the terminals 40 and 41 passes through the base portion 17 and connect respectively to each end portion of the connecting plate 27 and the ground plate 31. It is possible to omit the terminal 41 by employing a body ground in which the ground plate 31 connects electrically to the case 1. The other end portions of the terminal 42 and the other terminal not shown in the drawing also pass through the base portion 17 to the inner side thereof for connection to a static contact 43 of the fuel pump switch. Only one side is shown in the drawing, but the other pair of the terminals is provided at the front and rear direction of the drawing. Meanwhile, there is provided a movable contact 44 at the corresponding position to the static contact 43. The other movable contact 44 corresponding to the static contact 43 not shown in the drawing is provided to the front and rear direction of the drawing. A ring shaped plate spring 45 is provided between the retainer 18 and the base portion 28. When the slightly pressurized oil is applied from the oil-path 4, the diaphragm 5 is shifted to the inner side together with the slider 8 and the sub-assembly unit 15, in which the head portion 12 contacts with the flange 21, moves to the base portion 28 against the plate spring 45 so that the movable contact 44 and the static contacts 43 including each of the movable and the static contacts shown in the drawing, contact each other, with the result that the fuel pump switch turns on to actuate the fuel pump. The compression coil spring 19 is scarcely deformed.

As the more highly pressurized oil can deform the compression coil spring 19 to make the slide contact unit 13 move on the resistor unit 14, the sliding contact point of the slide contact 24 on the plate resistor 26 changes, thereby altering the resistance value of the electrical circuit which is constituted by the terminal 40, the connecting plate 24, the plate spring conductor 23, the slide contact 24, the ground plate 31 and the terminal 41.

The alteration of the resistance value is proportional to the length change of the compression coil spring 19. As the length change of the compression coil spring 19 is proportional to the oil pressure, it can detect the oil pressure changes as the resistance change. Numerals 46 and 47 in FIG. 1 are a seal element and a clamping portion. As the slider 8 and the shaft 20 separate independently and the head portion 12 of the adjustor 11 makes the curved surface contact with the flange 21, it can push the shaft 20 in the axial direction if the alteration of the diaphragm 5 is put aside. When the oil pressure decreases, the slider 8 is returned by the compression coil spring 19 and the shaft 20 is returned by the return spring 35 so that the slide contact 24 corresponds to the pressure change. The assembling method of the pressure variable resistor device will be described in the following. The diaphragm 5 and the diaphragm retainer 6 are fixed to the mouthpiece 2 by clamping, and the case 1 and the mouthpiece 2 are integrally welded.

At the coupler 16 side, the sub-assembly unit 15 mentioned above-before and all end portions of the connecting plate 27, the ground plate 31 and the terminals 40 and 41 are integrated by clamping at the base portions 28 and 17.

In the next stage, the slider 8 and the compression coil spring 19 are put into the case 1 and further the integrated unit of the sub-assembly unit 15 with the inserted retainer 18 around the guide 34 and the coupler 16 are put into the case 1. Under the above-mentioned conditions, the primary test, if the fuel pump switch is switched on within the predetermined pressure zone, can be done. If the fuel pump switch is not switched on, the slider 8 is taken out from the case 1 and the projecting length of the head portion 12 will be adjusted by managing the screwed length of the adjuster 11. When a good result is brought from the above-described adjustment, the case 1 around the seal element 46 provided at the outer peripheral groove of the base portion 17 is clamped to be fixed directly on the base portion 17. As the clamping process has also the final adjustment function for the operating zone of the fuel pump switch, the best position thereof should be fixed by managing the corresponding position between the case and the base portion 17 including the sub-assembly unit 15.

Since in the present embodiment the sub-assembly unit 15 which integrates the slide contact unit 13 and the resistor unit 14 can be built by the simple process in which the shaft 20 is inserted into the shaft hole 32 of the holder 20 and the stopping element is installed on the tip portion, easy maintenance is permitted, and assembly accuracy is improved. Further, automatic assembly can be used to perform the assembly process mentioned above. In the present embodiment it is possible to put in and take out the sub-assembly unit 15 from and to the case 1 a few times in order to make the adjustment by the adjuster 11. This is beneficial for the work. Further, as the shaft 20 is inserted into the holder 25, shifting of the shaft 20 to the axial direction will be slight during movement, the shaft 20 can move smoothly and there is a good accuracy of the contacting pressure of the slide contact unit 13 to improve the peformance of the pressure sensor.

As one example of its applied embodiment, the shaft 20 can be formed as the cylindrical element, and the holder 25 with the plate resistor 26 is formed as a shaft one inserted therein. Further, in case the resilient stopping projection is made integrally on the tip of the shaft in spite of the stopping element 36, the shaft 20 can be connected easily to the holder 25 during the inserting process.

Figure 4:
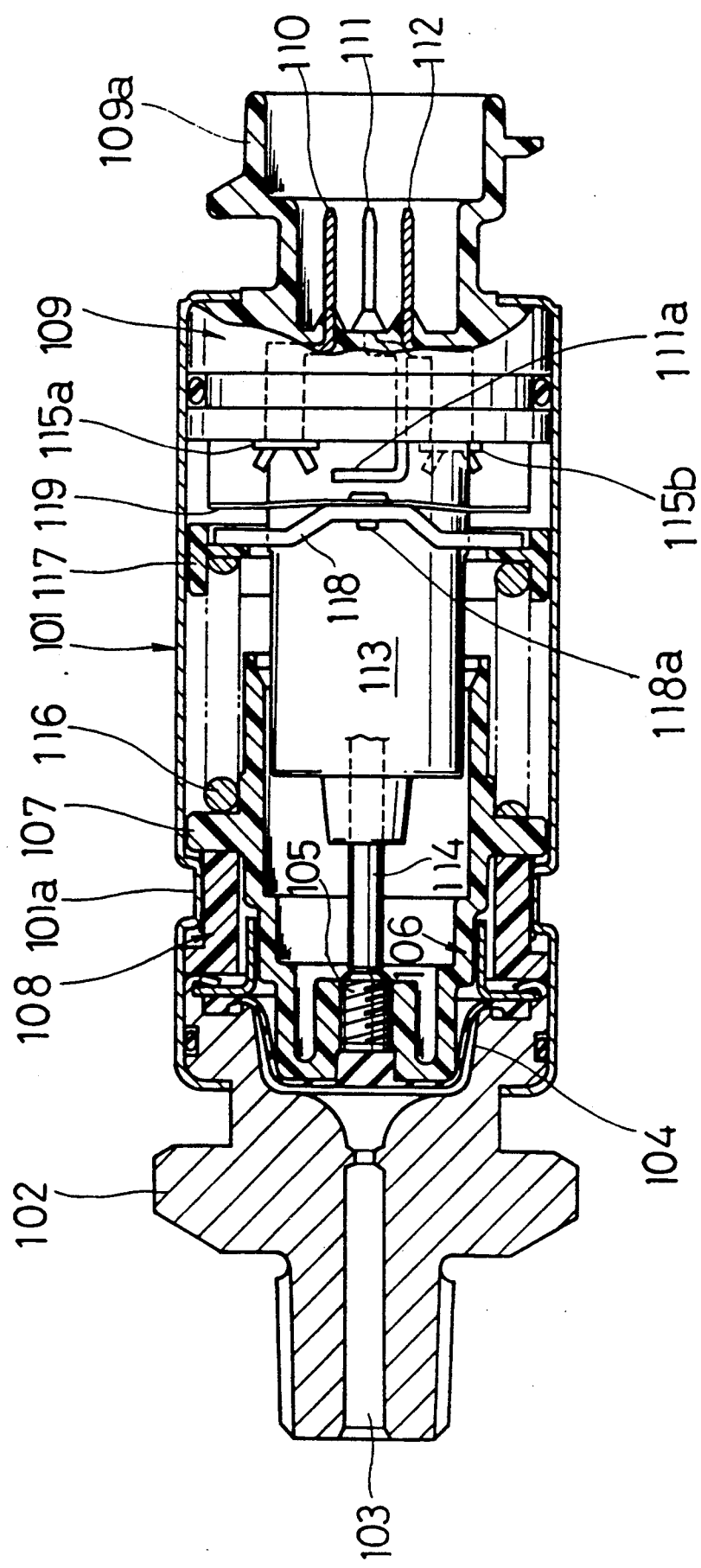
FIG. 4 and FIG. 5 show a second preferred embodiment.
Figure 5:
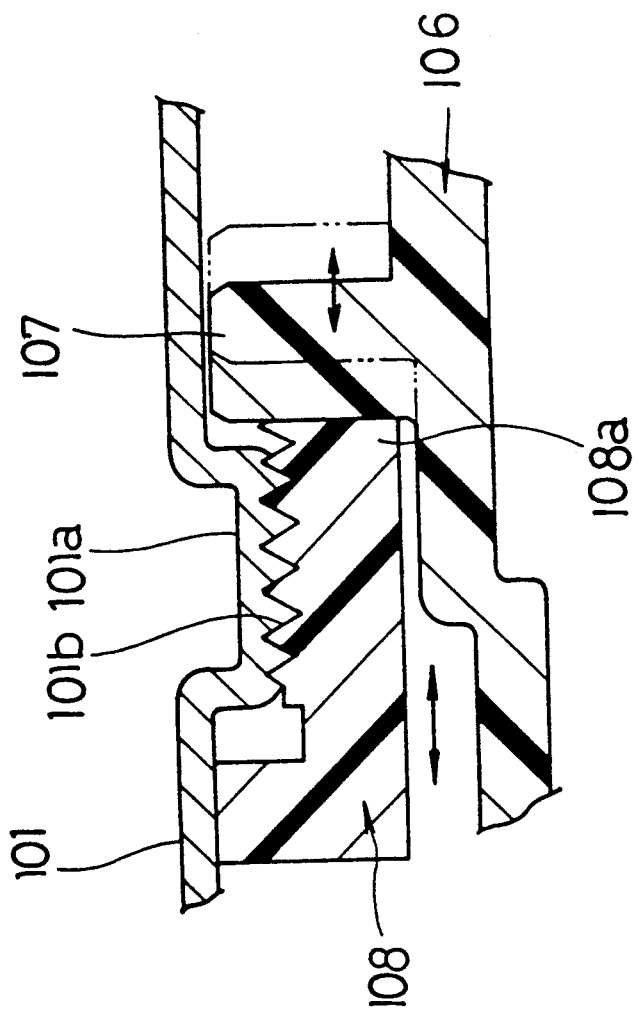

FIG. 4 and FIG. 5 show a second preferred embodiment of the present invention. FIG. 4 shows a vertical sectional view of the pressure detecting device. The pressure detecting device has a metal case 101 and a mouthpiece 102 is clamped to a part of the case 101. There is formed an pressurized oil path 103 in the axial direction at the mouthpiece 102 and is communicated to the inside of the case 101. The oil path 103 of its outlet in the case 101 is covered with a diaphragm 104, and the diaphragm 104 is fixed its periphery by the mouthpiece 102 and contacts with a slider 106 at the center through an adjust screw 105. The slider 106 is substantially cylindrical element with a bottom and is housed to be slidable by a flange- 107 within the case 101. The flange 107 is supported in contact with an adjust element 108 provided in the case 101. As shown in FIG. 5 which shows the enlarged part, the adjust element 108 forms the screw around its circumference, with which the adjust element 108 is fitted with a screw portion 101b which is provided inside a groove 101a formed at part of the case 101. One end 108a of the adjust element 108 with its one end contacts with the flange 107.

On the other hand, there is inserted and clamped a switch base 109 to the other end of the case 101. A coupler 109a is formed outside the case of the switch base 109 in which four terminals including Numerals 110 to 112 projects. The terminals 110 to 112 are connected to an oil pressure display circuit, not shown in the drawing, and the terminal 111 which is one of a pair, is connected to a fuel pump operating display circuit, also not shown in the drawing. As the terminal 111 is provided in the front and the rear direction of the drawing, the other one of the pair is not seen. A variable resistor unit 103 is installed inside the switch 109, of which the external view is shown. The variable resistor unit 113 is a substantially cylindrical figure received in the tip end of the cylindrical portion of the slider 106, and a shaft 114 projecting from the tip end contacts with a head portion formed on the curved face of the adjust screw 105. The shaft 114 is movable forwardly and rearwardly in the variable resistor unit 113, and variable resistor unit 113 varies according to the amount variation of the shaft 114 movement in relation to the variable resistor unit 103 by the slider which moves accoding to the oil pressure. The terminals 115a and 115b of the variable resistor unit 113 are respectively in contact with the terminals 110 and 112 at the end face of the switch base 109.

Around the periphery of the slider 106 and the variable resistor unit 113, a coil spring 116 is provided having its one end provided at the flange 107 and the other end provided around the variable resistor unit 113, each of which is supported in touch with a retainer 117 which can slide in the case 101. The retainer contacts with a movable contact plate 118, which is fitted to be movable in the axial direction around the periphery of the variable resistor unit 113, and the movable contact plate 118 is supported under a floating condition by the ring-shaped plate spring 119. A contact 118a of the movable contact plate 118 is contactable with a bent end 111a of the terminal 111. The contact 118a and the bent end 111a are also formed symmetrically on the opposite side of the variable resistor unit 113 in FIG. 2.

As the plastic force of the bent end 111a and the plate spring 119 are much smaller than that of the spring 116, the contact 118a can easily contact with the bent end 111a and switch on the fuel pump switch by applying the pressure slightly to the slider 106 through the oil pressure path 103. In the present embodiment, the position of the slider 106, the primary set position, in which the fuel pump switch is switched on, is set at the position where the oil pressure is slightly lower than one corresponding to the resistance value, the primary setting resistance value, which the variable resistor unit 113 detects primarily.

The operation of the present embodiment will be described in the following. First, to assemble the pressure detecting device, the switch base 109 which is previously integrated with the case 101, and the variable resistor unit 113, the slider 116, the spring 116 and the retainer 117 are housed, and the adjust element 108 is fitted with the screwed portion 101b and its one end 108a is touched at the flange 107. Under this condition, the adjust element 108 is moved forwardly and rearwardly without any oil pressure to the slider 106 and the slider 106 is moved within the case 101, and electric current is applied between the terminals 110 and 112 and the resistnace value is measured. If the initial value is not obtained, the adjust element 108 is moved either forwardly or rearwardly to adjust the initial position of the slider 106 so that the initial value is obtained. When the initial position of the slider 106 is fixed, the adjust element 108 is moved rearwardly at the predetermined small amount which corresponds to the difference between the initial position of the slider 106 to switch on the fuel pump swith and the starting position of detecting the initial value of the variable resistor unit 113, and is primarily determined by experiment, resulting in the determination of the initial position of the slider 106. The mouthpiece 102 is inserted and clamped to the end portion of the case 101, and the pressure detecting device is finally assembled. As the initial position of the slider 106 is set by means of the adjusting element 108, inaccuracy due to clamping rarely occurs.

Incidentally, as the screwed portion 101b is formed at the inner face of the groove 101a in the present embodiment, the adjust element 108 can be easily fitted inside the case 101 so that influence on the accuracy due to the fitting process of the mouthpiece 102 can be eliminated. It is also possible to install the adjust element 108 to another element which is fixed in the case. As there is provided the adjust element 108, after the initial position of the slider 106 is determined, the operation of the variable resistor unit 113 can be checked again to be able to adjust the initial set position for the variable resistor unit 113 itself by moving the adjust screw 105 unless it can not detect the initial value notwithstanding the position of the slider 106 positions to start detecting the initial value.

The present invention is not limited to the above-mentioned embodiment and can apply to various kinds of embodiments.

We claim:

1. A hydraulic actuating apparatus for sensing hydraulic pressure, comprising:
   a slider which is movable in proportion to the hydraulic pressure;
   a variable resistor unit having a resistance value which changes in response to movement of said slider;
   resilient means which is resiliently deformable by movement of said slider and which exerts a restoring force opposing the movement of said slider caused by said hydraulic pressure; and
   adjusting means for setting an initial resistance value of said variable resistor unit, said variable resistor unit having a portion which is in contact with said adjusting means.

2. A hydraulic actuating apparatus of claim 1, further comprising a housing case for movably supporting said adjusting means, and said adjusting means includes an end which is in contact with said variable resistor unit.

3. A hydraulic actuating apparatus of claim 2, wherein said adjusting means comprises a member having a curved head which is located at said end of said adjusting means, said curved head being in contact with said variable resistor unit.

4. A hydraulic actuating apparatus of claim 1, further comprising a housing case for movably supporting said adjusting means, wherein said adjusting means is disposed between said housing case and said resilient means.

5. A hydraulic actuating apparatus of claim 4, wherein said housing and said setting element are connected to each other by screw means.

6. A hydraulic actuating apparatus as claimed in claim 1, further comprising means for resiliently biasing said portion of said variable resistor unit against said adjusting means.

7. A hydraulic actuating apparatus for sensing hydraulic pressure and producing and output signal representative of the sensed hydraulic pressure, comprising:
   a base portion;
   a case;

a variable resistor unit and a slider movably connected to said variable resistor unit, said variable resistor unit being connected to said base and said slider being movable relative to said variable resistor unit by an amount proportional to the hydraulic pressure applied to said slider; said variable resistor unit having a resistance which changes in response to movement of said slider;

resilient means which are resiliently deformable by movement of said slider relative to said variable resistor unit, said resilient means exerting a restoring force on said slider opposing the movement of said slider caused by said hydraulic pressure; and adjusting means for setting an initial resistance value of said variable resistor unit, said variable resistor unit having a portion which is in contact with said adjusting means.

8. A hydraulic actuating apparatus as claimed in claim 7, wherein said slider comprises a threaded portion and said adjusting means comprises an adjuster member which is received in threaded engagement in said threaded portion of said slider, said adjuster member having an end which is projectable from said threaded portion for engagement with said variable resistor unit.

9. A hydraulic actuating apparatus as claimed in claim 8, wherein said variable resistor unit includes a slide contact unit and a resistor unit, said resistor unit having a resistance material and being fixed to said case, and said slide contact unit has an electrically conductive member which is slidable along said resistance material, whereby an electrical circuit can be formed between said electrically conductive member and a portion of said resistance material between the location of contact of said electrically conductive member with said resistance material, and a contact connected to said resistance material.

* * * * *